(12) United States Patent
Inoue et al.

(10) Patent No.: US 9,146,307 B2
(45) Date of Patent: Sep. 29, 2015

(54) ULTRASONIC DETECTION DEVICE

(75) Inventors: Satoru Inoue, Tokyo (JP); Ryotarou Suzuki, Tokyo (JP); Kunihiko Araki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 835 days.

(21) Appl. No.: 13/379,267

(22) PCT Filed: Sep. 14, 2009

(86) PCT No.: PCT/JP2009/004570
§ 371 (c)(1),
(2), (4) Date: Dec. 19, 2011

(87) PCT Pub. No.: WO2011/030389
PCT Pub. Date: Mar. 17, 2011

(65) Prior Publication Data
US 2012/0099397 A1    Apr. 26, 2012

(51) Int. Cl.
*G01S 7/527* (2006.01)
(52) U.S. Cl.
CPC ..................................... *G01S 7/527* (2013.01)
(58) Field of Classification Search
CPC ... B06B 1/0215; B06B 2201/40; G08B 29/02
USPC ......... 367/87; 702/57, 60, 65, 75; 703/1, 3, 4, 703/18, 20, 21, 22, 28; 706/47; 716/53, 716/115, 108, 109, 113, 118, 119, 136, 716/132; 342/198
See application file for complete search history.

(56) References Cited

U.S. PATENT DOCUMENTS

| | | | | | |
|---|---|---|---|---|---|
| 4,482,889 | A | * | 11/1984 | Tsuda et al. | 340/514 |
| 7,039,572 | B1 | * | 5/2006 | Narahara et al. | 703/14 |
| 2007/0268372 | A1 | * | 11/2007 | Kondo et al. | 348/208.4 |

FOREIGN PATENT DOCUMENTS

| | | |
|---|---|---|
| DE | 2 151 348 A1 | 4/1973 |
| DE | 10 2007 043 501 A1 | 3/2009 |
| JP | 59-34372 U | 3/1984 |
| JP | 61-233385 A | 10/1986 |

(Continued)

OTHER PUBLICATIONS

"The Measurement and Analysis of Pulse Width in ELINT/ESM" (National Information Control Laboratory, Chengdu 610036, China) (2007).

*Primary Examiner* — Isam Alsomiri
*Assistant Examiner* — Amienatta M Ndure Jobe
(74) *Attorney, Agent, or Firm* — Birch, Stewart, Kolasch & Birch, LLP

(57) ABSTRACT

An ultrasonic detection device is constructed in such a way as to include a discriminating processing unit (a time width detecting part 13 and a pulse width discrimination part 14) for approximating the shape of each signal which is a reflection signal which is reflected from an object as a result of transmitting a ultrasonic pulse toward the object, or a noise as an isosceles triangle and computing a pulse time width equal to the length of the base of the approximating isosceles triangle, and for discriminating between the reflection signal and the noise signal by determining whether the computed pulse time width exceeds a predetermined pulse width discrimination threshold. Therefore, the ultrasonic detection device can determine the pulse time width with stability, and carry out the discriminating process with a high degree of reliability.

4 Claims, 9 Drawing Sheets

Computation of Maximum $Vp1 > Vp2 > Vp3 \cdots$
$Vp = (\Sigma Vpi)/n$
or
$Vp = (\Sigma Vpi - Vpimax)/n-1$
$i = 1, 2, 3, \cdots n$

(56) References Cited

FOREIGN PATENT DOCUMENTS

| JP | 62-152282 U | 9/1987 |
| JP | 62-220889 A | 9/1987 |
| JP | 7-7056 B2 | 1/1995 |
| JP | 08-220214 A | 8/1996 |
| JP | 2001-22813 A | 1/2001 |
| JP | 2003-156561 A * | 11/2001 | .............. G01S 15/10 |
| JP | 2003-156561 A | 5/2003 |
| JP | 2006-275634 A * | 3/2005 | ................ G01S 7/32 |
| JP | 2006-275634 A | 10/2006 |

* cited by examiner (a)

(b)

ULTRASONIC DETECTION DEVICE

FIELD OF THE INVENTION

The present invention relates to an ultrasonic detection device which transmits an ultrasonic pulse toward an object from a pulser, and discriminates a noise mixed into a reflection signal received by a receiver from the reflection signal by using their pulse time widths.

BACKGROUND OF THE INVENTION

An ultrasonic detection device as mentioned above is disclosed by patent reference 1, for example. The ultrasonic detection device disclosed in patent reference 1 measures a pulse time width and stores this pulse time width temporarily by amplifying a reflection signal into which a noise is mixed, and, after that, shaping the waveform of the reflection signal by counting a clock by using the reflection signal shaped in waveform as a gate. Then, the ultrasonic detection device measures pulse time widths sequentially by performing the same process, and, when the pulse time width of each of the immediately-preceding and next reflection signals is equal to or larger than a predetermined value, determines that the waveform at that time is that of a noise.

RELATED ART DOCUMENT

Patent Reference

Patent reference 1: Japanese Unexamined Patent Application Publication No. Sho 62-220889

SUMMARY OF THE INVENTION

However, according to the technology disclosed by above-mentioned patent reference 1, because the waveform shaping is performed by using a fixed threshold, in the case in which neither the full-wave-rectified reflection signal nor a noise has a rectangular waveform, e.g., in the case in which the full-wave-rectified reflection signal and a noise are triangular-shaped pulses, the measurement values of the pulse time widths also change as their amplitudes change, and therefore the noise discrimination cannot be carried out with stability.

When the threshold used for the waveform shaping is further lowered in order to solve this problem, there is a high possibility that the ultrasonic detection device malfunctions because this ultrasonic detection device carries out the noise discrimination while including unstable background noise components. A further problem is that when determining a pulse time width from quantization data, a time width error which has a maximum of twice as large as a sampling period occurs.

The present invention is made in order to solve the above-mentioned problems, and it is therefore an object of the present invention to provide an ultrasonic detection device which can determine a pulse time width with stability and which can carry out a reliable discriminating process.

In order to solve the above-mentioned problems, in accordance with the present invention, there is provided an ultrasonic detection device which transmits an ultrasonic pulse toward an object from a pulser thereof, and discriminates a noise mixed into a reflection signal received by a receiver thereof from the reflection signal by using a pulse time width, wherein the ultrasonic detection device includes a discriminating processing unit for performing a discriminating process of approximating a shape of each signal which is the reflection signal or a noise as an isosceles triangle and computing a pulse time width equal to a length of a base of the above-mentioned approximating isosceles triangle, and for discriminating between the reflection signal and the noise signal by determining whether the computed pulse time width exceeds a predetermined pulse width discrimination threshold.

Because in accordance with the present invention, the discriminating processing unit approximates the shape of each signal which is the reflection signal or a noise as an isosceles triangle and computes the pulse time width equal to the length of the base of the above-mentioned approximating isosceles triangle, and discriminates between the reflection signal and the noise signal by determining whether the computed pulse time width exceeds the predetermined pulse width discrimination threshold, the ultrasonic detection device can determine the pulse time width with stability, and carry out the reliable discriminating process even when the waveforms of the full wave rectified reflection signal and the full wave rectified noise are not rectangular.

EMBODIMENTS OF THE INVENTION

Hereafter, in order to explain this invention in greater detail, the preferred embodiments of the present invention will be described with reference to the accompanying drawings.

Embodiment 1

Figure 1:
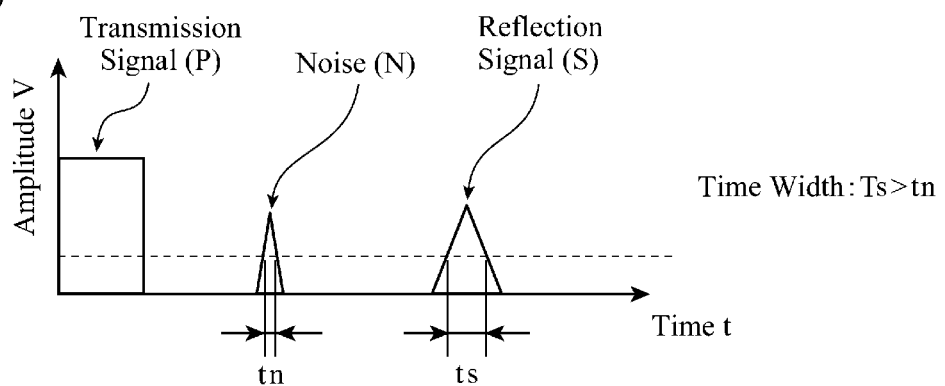
FIG. 1 is a view showing the principle behind noise discrimination carried out by an ultrasonic detection device in accordance with Embodiment 1 of the present invention.
Figure 1:
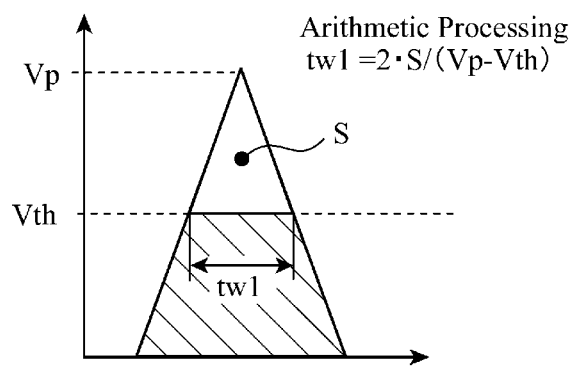

FIG. 1 is a view showing the principle behind noise discrimination carried out by an ultrasonic detection device in accordance with this Embodiment 1. In FIG. 1(a), the waveforms of a transmission pulse transmitted by and a reception pulse received by a pulser/receiver disposed in the ultrasonic detection device in accordance with this Embodiment 1. In FIG. 1(b), an area S, a maximum amplitude Vp, and an amplitude threshold Vth which are parameters used when computing a pulse time width tw1 are shown in the waveform of a signal which is a reflected wave signal or a noise.

For example, the ultrasonic detection device in accordance with this Embodiment 1, which can be used as a corner sensor of a vehicle, transmits an ultrasonic pulse toward an object from the pulser thereof, and receives a reflection signal from the object by using the receiver thereof. It is known that a noise component including an electromagnetism noise, a noise caused by a whizzing sound, a noise caused by raindrops, and a noise caused by water dissipated from a tire can be included in this reflection signal.

In FIG. 1(a), a noise n which is acquired by carrying out full wave rectification of a signal received by the receiver, and the reflection signal S, as well as the ultrasonic pulse p which is the transmission signal, are shown in time sequence on the time axis (time t) while the vertical axis shows an amplitude V.

In this figure, the reflection signal S has an area in which the hatched portion shown in FIG. 1(b) is excluded.

Furthermore, the reflection signal S and the noise n have pulse time widths ts and tn having a relationship of ts>tn, and it is rare that the reflection signal S and the noise n appear at the same time.

As shown in FIG. 1(a), when the reflection signal S and a noise n coexist, the ultrasonic detection device in accordance with this Embodiment 1 performs arithmetic operations to compute the integral S of the amplitude of each signal and a maximum amplitude Vp of each signal during a time interval (the pulse time width tw1) during which the signal which is the reflection signal S or the noise n has an amplitude equal to or larger than an amplitude threshold Vth shown in FIG. 1(b) continuously. To this end, the ultrasonic detection device in accordance with this Embodiment 1 approximates the shape of each signal which is the reflection signal S or the noise n as an isosceles triangle, computes the pulse time width tw1 which is the length of the base of the isosceles triangle from the above-mentioned integral S and the above-mentioned maximum amplitude Vp according to the following computing equation (1), and performs a noise discriminating process of discriminating between the reflected wave S and the noise n by determining whether the pulse time width exceeds a pulse width discrimination threshold Tth.

$$tw1 = 2 \cdot S/(Vp - Vth) \quad (1)$$

The ultrasonic detection device in accordance with this Embodiment 1 discriminates between the reflected wave S and the noise n in this way by using the base length in the case of approximating the shape of each signal which is the reflection signal S or the noise n as a triangle when the waveform of each of the reflection signal S and the noise n which the ultrasonic detection device has acquired by carrying out full wave rectification of each signal received by the receiver is not rectangular, thereby improving the reliability of the noise discrimination.

Figure 2:
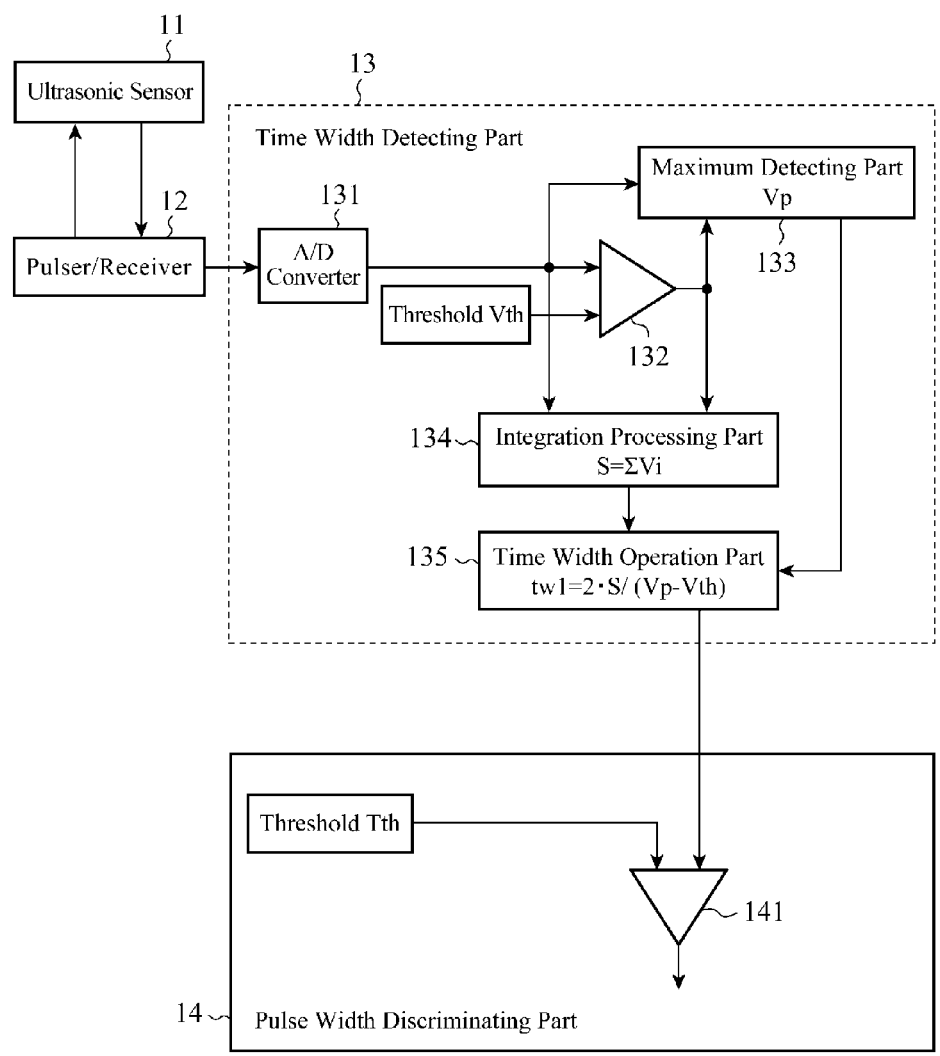
FIG. 2 is a block diagram showing the structure of the ultrasonic detection device in accordance with Embodiment 1 of the present invention.

FIG. 2 is a block diagram showing the structure of the ultrasonic detection device in accordance with this Embodiment 1. As shown in FIG. 2, the ultrasonic detection device in accordance with this Embodiment 1 is constructed in such a way as to include an ultrasonic sensor 11, the pulser/receiver 12, a time width detecting part 13, and a pulse width discriminating part 14.

The ultrasonic sensor 11 is a vibrator which consists of, for example, a piezo-ceramic element. An electromotive force occurs between electrodes of the ultrasonic sensor because of a mechanical force applied to the element. Conversely, when a voltage is applied to between the electrodes, a mechanical displacement according to the voltage occurs in the ultrasonic sensor. Thus, the pulser/receiver 12 applies electrical energy to the ultrasonic sensor to cause this ultrasonic sensor to create an ultrasonic wave, while the ultrasonic sensor converts ultrasonic energy acquired from the reflected wave into an electric signal and furnishes this signal to the time width detecting part 13.

The time width detecting part 13 is constructed in such a way as to include an A/D (Analog/Digital) converter 131, an amplitude comparing part 132, a maximum detecting part 133, an integration processing part 134, and a time width arithmetic operation part 135.

The A/D converter 131 quantizes (performs full wave rectification on) the reflected wave including a noise and received by the pulser/receiver 12 at predetermined sampling periods, and furnishes the full wave rectified signal to one input terminal of the amplitude comparing part 132. The amplitude threshold Vth is furnished to another input terminal of the amplitude comparing part 132, and the amplitude comparing part 132 compares the full wave rectified reflected wave S including the noise n with the amplitude threshold Vth and furnishes the data having an amplitude exceeding this threshold Vth to the integration processing part 134 and the maximum detecting part 133.

The integration processing part 134 computes the integral S (the area S=ΣVi) of the amplitude of the data during the time interval having a time length of tw1 during which the signal which is the reflection signal S or the noise n has an amplitude equal to or larger than the amplitude threshold Vth continuously, and furnishes the integral to the time width operation part 135. The maximum amplitude Vp during the time interval of tw1 is furnished from the maximum detecting part 133 to the time width operation part 135, and the time width operation part computes the pulse time width tw1 according to the above-mentioned computing equation (1) and outputs the pulse time width to the pulse width discriminating part 14.

The pulse width discriminating part 14 includes a time comparator 141, and the pulse width discrimination threshold Tth, as well as the result of the above-mentioned computation of tw1 acquired by the time width operation part 135 of the time width detecting part 13, is furnished to this time comparator 141.

The time comparator 141 compares the both inputs, and, when the value of tw1 which is computed and outputted by the time width operation part 135 exceeds the pulse width discrimination threshold Tth, determines that the signal is the reflection signal S whereas when the value of tw1 which is computed and outputted by the time width operation part 135 is equal to or smaller than the pulse width discrimination threshold Tth, the time comparator determines that the signal is a noise n.

Thus, the above-mentioned time width detecting part 13 and the above-mentioned pulse width discriminating part 14 operate in cooperation with each other to function as a discriminating processing unit for "approximating the waveform of each signal which is a reflection signal or a noise signal as an isosceles triangle, computing the pulse time width which is equal to the length of the base of the approximating isosceles triangle, performing the discriminating process of discriminating between the reflection signal and the noise signal by determining whether or not the computed pulse time width exceeds the predetermined pulse width discrimination threshold".

More specifically, the discriminating processing unit determines the integral (area S) of the amplitude of each signal, which is included in the received signal in which a reflection signal S and a noise n coexist, and the maximum amplitude Vp₀ of each signal during a time interval (tw1) during which each data has an amplitude equal to or larger than the predetermined amplitude threshold Vth continuously, approximates the waveform of each signal which is the reflection signal S or the noise n as an isosceles triangle, and computes the pulse time width tw1 which is equal to the length of the base of the triangle from the integral S and the maximum amplitude Vp₀ by using the time width detecting part 13, and discriminates the noise from the reflection signal by determining whether the pulse time width tw1 exceeds the predetermined pulse width discrimination threshold Tth by using the pulse width discriminating part 14.

As mentioned above, even when the waveform of each of a reflection signal S and a noise n which is acquired by carrying out full wave rectification of each signal is not rectangular, the ultrasonic detection device in accordance with this Embodiment 1 approximates the waveform of each of the signals as an isosceles triangle, and computes the pulse time width tw1 which is equal to the length of the base of the approximating isosceles triangle. As a result, the ultrasonic detection device can discriminate between the reflected wave S and the noise n, thereby improving the reliability. When the sampling time period length is long, the weight of the measuring time becomes small by computing the base length tw1 from the area S of the isosceles triangle, though variations in the measurement value of the pulse time width tw1 become large. Therefore, variations in the time measurement become small and the discrimination and determination become stable.

Embodiment 2

Figure 3:
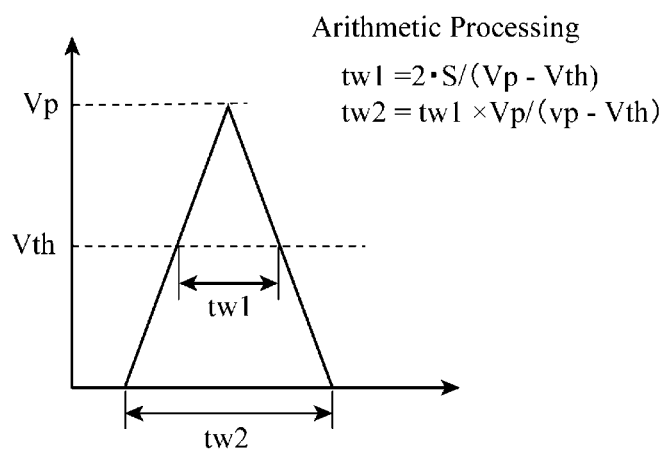
FIG. 3 is a view showing the principle behind noise discrimination carried out by an ultrasonic detection device in accordance with Embodiment 2 of the present invention.
Figure 4:
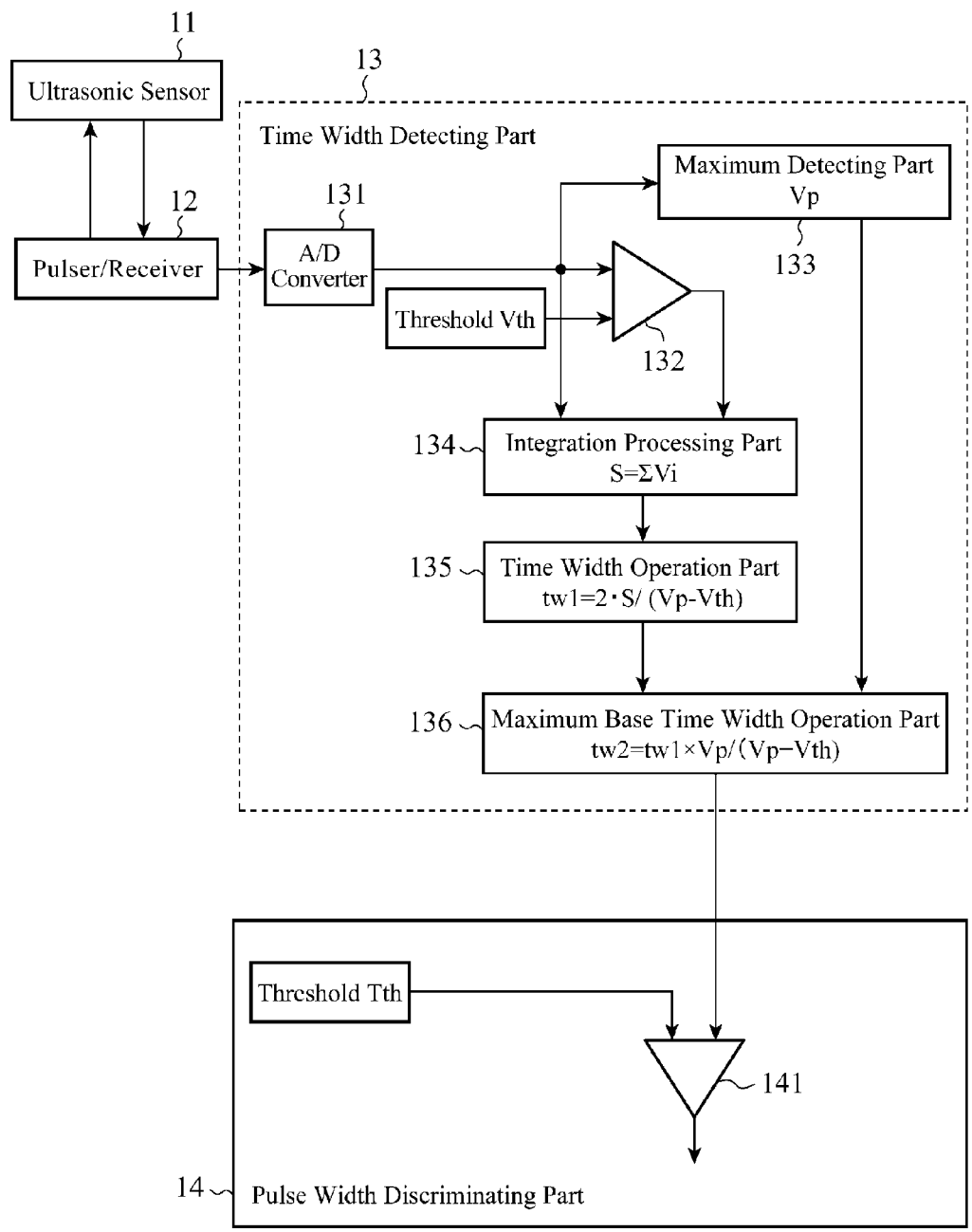
FIG. 4 is a block diagram showing the structure of the ultrasonic detection device in accordance with Embodiment 2 of the present invention.

FIG. 3 is a view showing the principle behind noise discrimination carried out by an ultrasonic detection device in accordance with this Embodiment 2, and FIG. 4 is a block diagram showing the structure of the ultrasonic detection device in accordance with this Embodiment 2.

As can be seen from FIG. 3, the ultrasonic detection device in accordance with this embodiment differs from that in accordance with Embodiment 1 shown in FIG. 1(b) in that after approximating the waveform of a reflected wave S (a noise n) as an isosceles triangle, like that of Embodiment 1, further determines a similar isosceles triangle from a similarity expression of the isosceles triangle, and determines the length of the base of the similar isosceles triangle, i.e., the pulse time width tw2 of each of the reflection signal and the noise n according to the following computing equation (2). A noise discriminating process of discriminating between the reflected wave S and the noise n by determining whether or not this pulse time width tw2 exceeds a pulse width discrimination threshold Tth is the same as that shown in Embodiment 1.

$$tw2 = tw1 \times Vp/(Vp-Vth) \qquad (2)$$

To this end, as shown in FIG. 4, the ultrasonic detection device additionally includes a maximum base time width operation part 136 in addition to the structure of the time width detecting part 13 in accordance with Embodiment 1. The maximum base time width operation part 136 computes the pulse time width tw2 which is the base of the similar triangle according to the above-mentioned computing equation (2), and outputs the pulse time width to a pulse width discriminating part 14. The other structural components of the ultrasonic detection device are the same as those of Embodiment 1 shown in FIG. 2.

In the ultrasonic detection device in accordance with this Embodiment 2, because a discriminating processing unit determines a similar isosceles triangle from a similarity expression of an isosceles triangle which approximates the waveform of each signal which is a reflected wave S or a noise n, and computes the pulse time width which is equal to the length of the base of this similar isosceles triangle, this embodiment provides the same advantages as those provided by above-mentioned Embodiment 1. In addition, because the following relationship: tw1<tw2 is established in their pulse time widths, a measuring error of the pulse time width occurring in tw2 is reduced greatly compared with that occurring in tw1, and therefore the reliability can be further improved.

Embodiment 3

Figure 5:
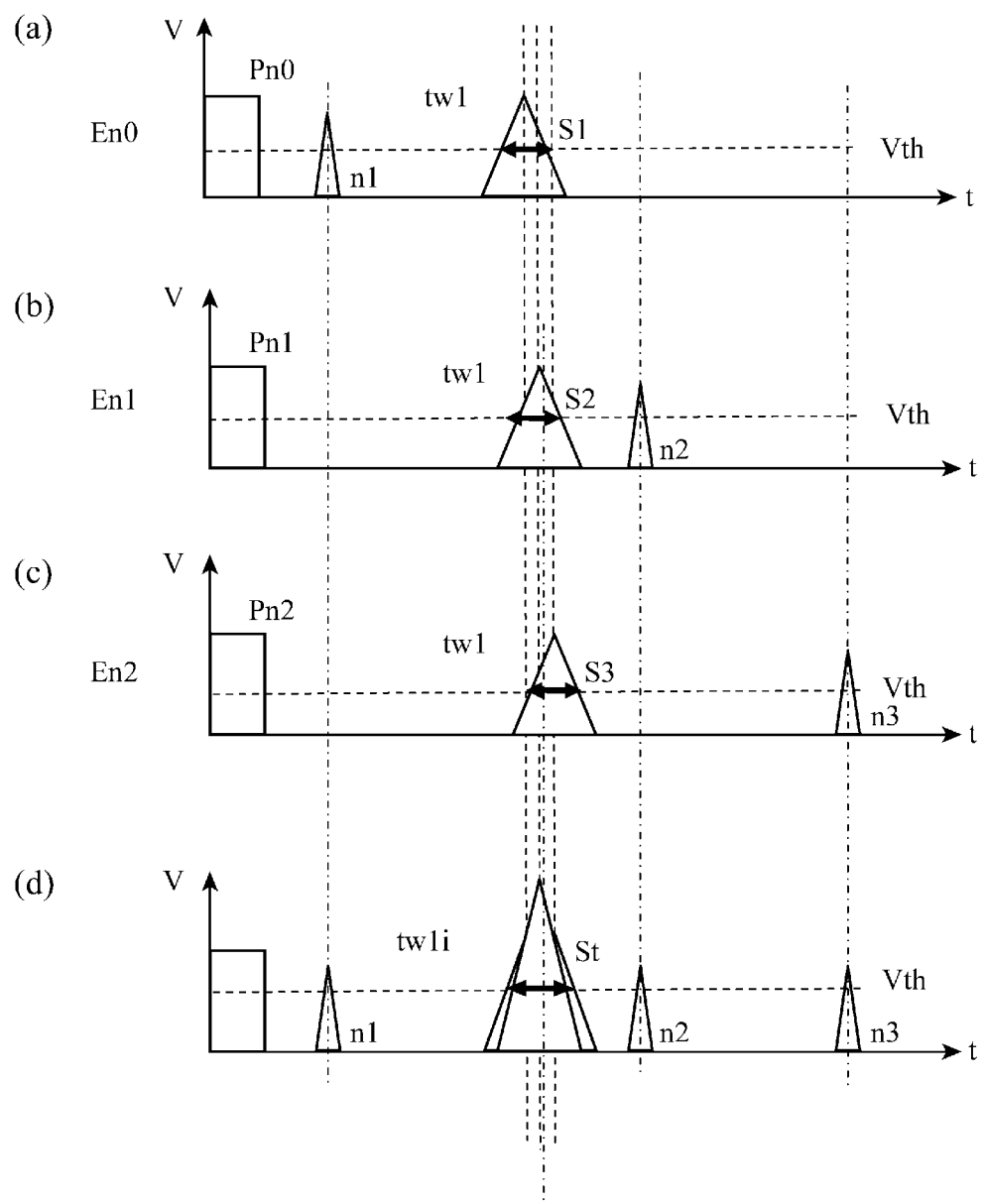
FIG. 5 is a view showing the principle behind noise discrimination carried out by an ultrasonic detection device in accordance with Embodiment 3 of the present invention.
Figure 6:
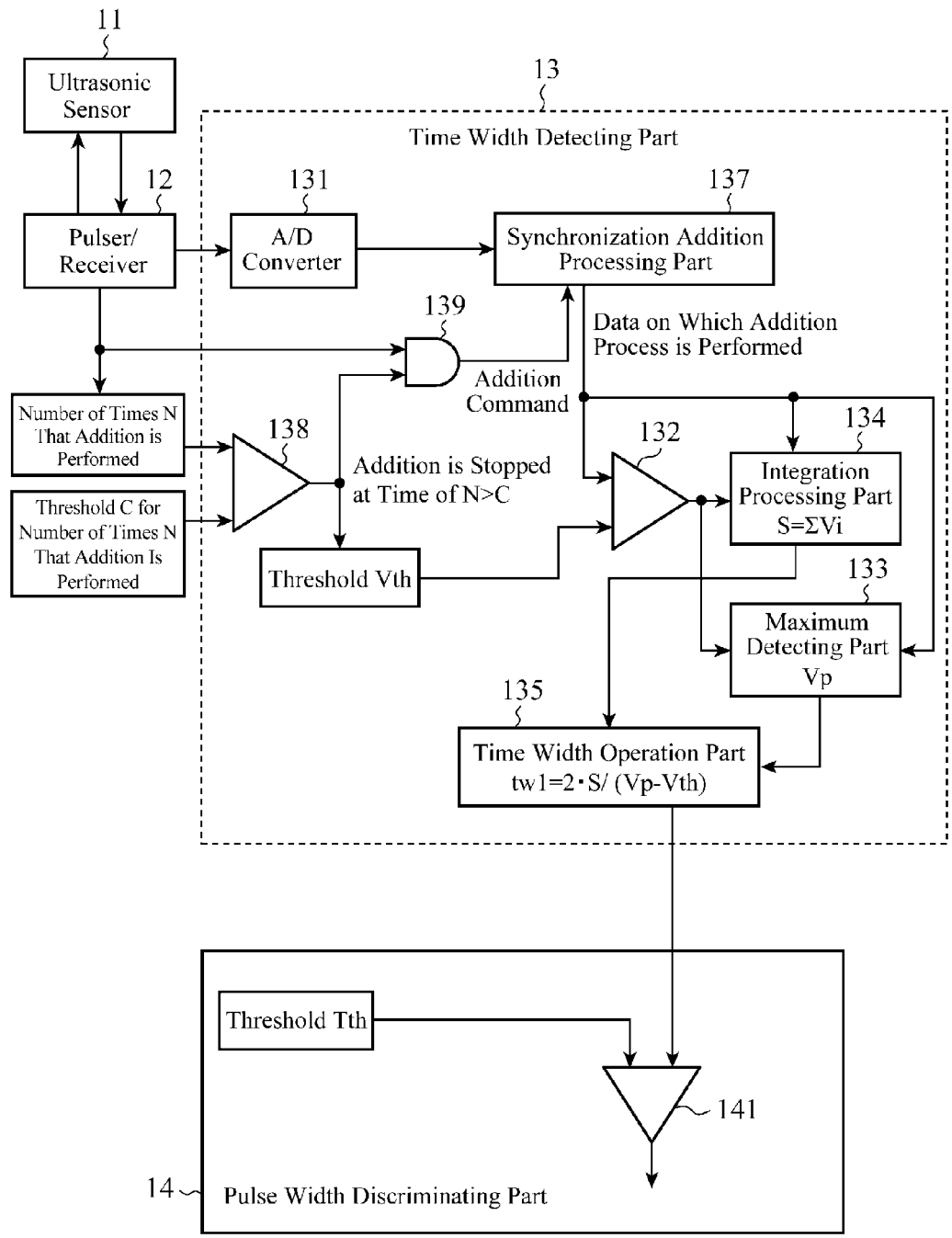
FIG. 6 is a block diagram showing the structure of the ultrasonic detection device in accordance with Embodiment 3 of the present invention.

FIG. 5 is a view showing the principle behind noise discrimination carried out by an ultrasonic detection device in accordance with this Embodiment 3, and FIG. 6 is a block diagram showing the structure of the ultrasonic detection device in accordance with this Embodiment 3.

Reflection signals S1 to S3 which are received at predetermined times (En0, En1, and En2) in synchronization with ultrasonic pulses transmitted by a pulser/receiver 12 in the ultrasonic detection device in accordance with this Embodiment 3 are shown in time sequence in FIGS. 5(a) to 5(c), respectively. FIG. 5(d) shows a signal component St which is acquired by combining (adding up) the reflection signals S1 to S3 respectively received at the times En0, En1, and En2. In FIG. 5(d), tw1$i$ shows the pulse time width of the reflection signal St which is acquired by combining (adding up) the reflection signals S1 to S3.

In this embodiment, the ultrasonic detection device performs a noise discriminating process as explained in Embodiment 1 or Embodiment 2 on the reflection signals S1 to S3 which are acquired by adding the reflection signal S onto which a noise n is piggybacked a predetermined number of times (three times at En0, Ent, and En2) in synchronization with ultrasonic pulses p (pn0, pn1, pn2, ... ) transmitted at predetermined times, and on noises n1 to 3. In this case, because a reflection signal having a small amplitude is amplified and increases in amplitude, an obstacle (object) having a small reflecting surface or an object positioned at a long distance can be detected.

To this end, as shown in FIG. 6, the ultrasonic detection device additionally includes a synchronization addition processing part 137, an addition number comparator 138, and an AND circuit (A139) in addition to the structure of the time width detecting part 13 in accordance with Embodiment 1 shown in FIG. 2. The other structural components are the same as those in accordance with Embodiment 1.

In FIG. 6, the synchronization addition processing part 137 combines (adds up) the reflection signals S1 to S3 respectively outputted via the A/D converter 131 at the times of En0, En1, and En2 and stores the time series data, as explained with reference to FIG. 5. The output is furnished to one input terminal of an amplitude comparing unit 132, a maximum detecting part 133, and an integration processing part 134. Furthermore, the number of times N that the addition is carried out and a threshold (referred to as an addition threshold C from here on) for the number of times that the addition is carried out are furnished from a pulser/receiver 12 to the addition number comparator 138. In addition, the result of comparison between the number of times that the addition is carried out and the addition threshold, which is the output of the addition number comparator 138, is furnished to one input terminal of the AND circuit 139, and the output of the transmission pulse (pn0, pn1, pn2, ... ) from the pulser/receiver 12 is furnished to another input terminal of the addition number comparator. The result of the AND operation carried out by the AND circuit is outputted to the synchronization addition processing part 137 as an addition command. Therefore, the synchronization addition by the synchronization addition processing section 137 is repeatedly carried out until the number of times that the addition is carried out reaches the addition threshold. More specifically, the synchronization addition processing part 137 stops the synchronization addition process when N>C.

Because in the ultrasonic detection device in accordance with this Embodiment 3, a discriminating processing unit performs the discriminating process on the reflection signal St which the ultrasonic detection device has acquired by adding up the reflection signals S into each of which a noise n is mixed a predetermined number of times in synchronization with the ultrasonic pulses p, the reflection signals S1 to S3 having a small amplitude which are the target for the discriminating process are amplified, and the reflection signal St whose amplitude is increased is discriminated from the noise. Therefore, an obstacle (object) having a small reflecting surface or an object positioned at a long distance can be detected.

The discriminating process is the one of, even when the waveform of each of a reflection signal S and a noise n which is acquired by carrying out full wave rectification of each signal is not rectangular, approximating the waveform of each of the signals as an isosceles triangle, and computing the pulse time width which is equal to the length of the base of the approximating isosceles triangle, or the one of further determining a similar isosceles triangle from a similarity expression of the isosceles triangle, and computing the pulse time width which is equal to the length of the base of the similar isosceles triangle, as explained in Embodiment 1 or Embodiment 2.

Figure 7:
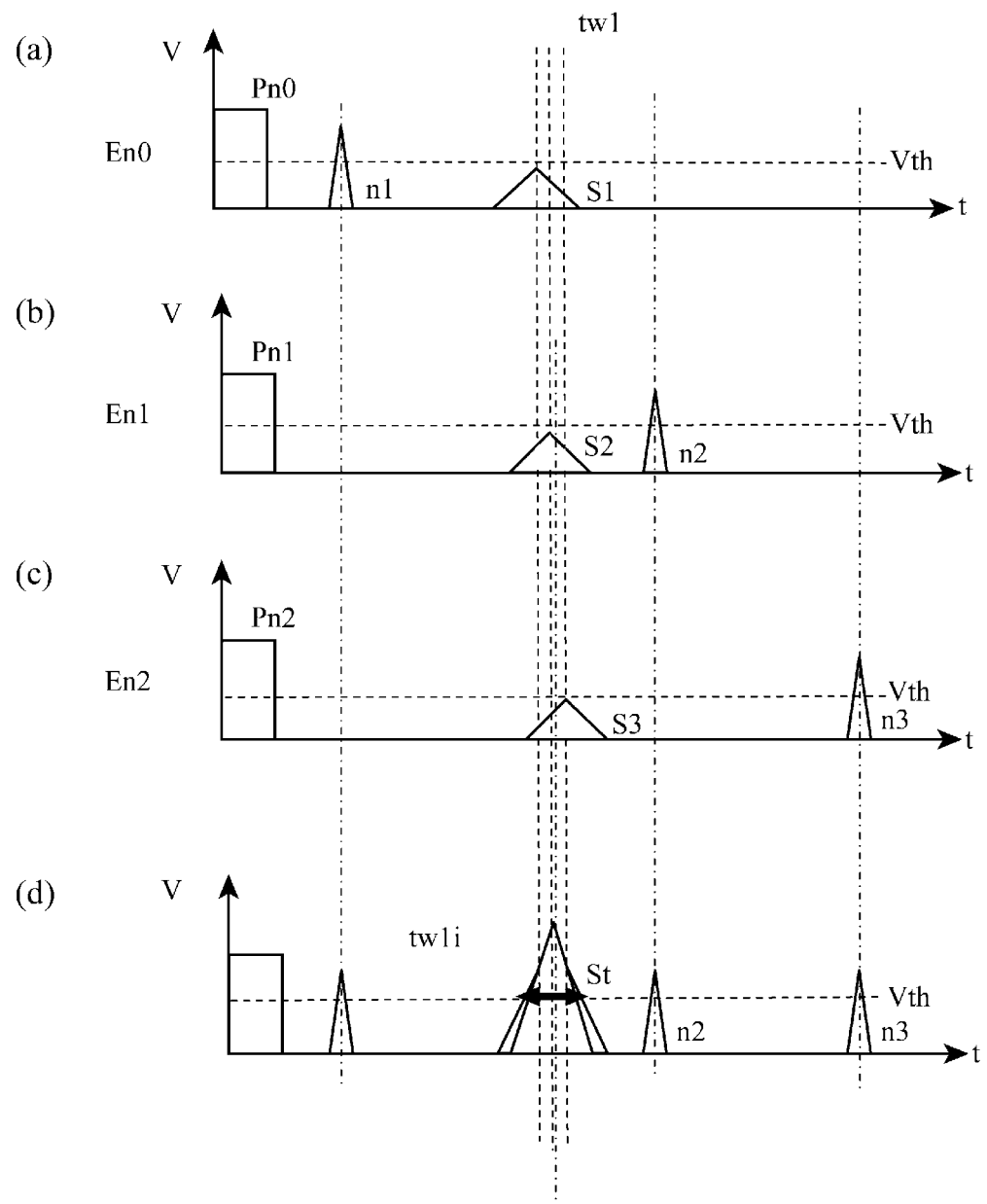
FIG. 7 is a view showing the principle behind noise discrimination carried out by an ultrasonic detection device in accordance with a variant of Embodiment 3 of the present invention.

The discriminating processing unit in accordance with above-mentioned Embodiment 3 performs the discriminating process on the reflection signal St which the ultrasonic detection device has acquired by adding up the reflection signals S into each of which a noise n is mixed a predetermined number of times in synchronization with the ultrasonic pulses p. As an alternative, the discriminating processing unit can add up the reflection signals S into each of which a noise n is mixed in synchronization with the ultrasonic pulses p, and perform the discriminating process on the reflection signal only when the reflection signal has an amplitude exceeding a predetermined amplitude threshold. In this case, the same advantages can be provided. This case will be explained hereafter as a variant of Embodiment 3. The principle behind noise discrimination carried out by this variant is shown in FIG. 7, and the structure of an ultrasonic detection device in accordance with the variant is shown in FIG. 8.

As shown in FIG. 7(d), the ultrasonic detection device in accordance with this variant of Embodiment 3 adds up the reflection signals S1 to S3 which are acquired at the times of En0, En1, and En2, respectively, and carries out the discriminating process on the reflection signal St only when the reflection signal has an amplitude exceeding the threshold tw1i. The ultrasonic detection device can detect an obstacle (object) having a small reflecting surface or an object positioned at a long distance, and therefore can improve its sensitivity of obstacle detection, like that of above-mentioned Embodiment 3.

Figure 8:
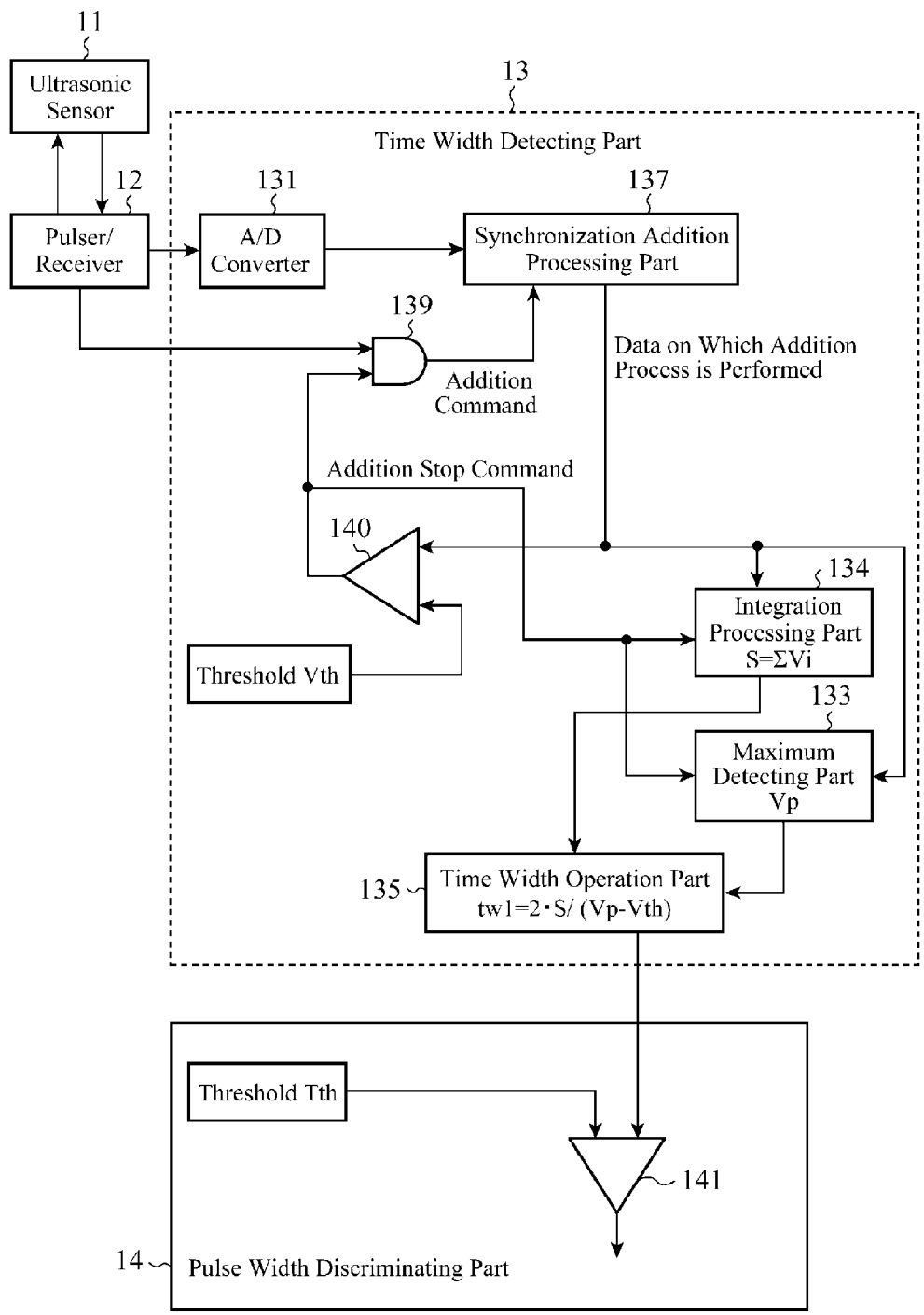
FIG. 8 is a block diagram showing the structure of the ultrasonic detection device in accordance with the variant of Embodiment 3 of the present invention.

In this case, in the ultrasonic detection device, the addition number comparator 138 in the time width detecting part 13 of FIG. 6 is replaced by an amplitude comparator 140, as shown in FIG. 8, and this amplitude comparator 140 is constructed in such a way that the output of the synchronization addition processing part 137 is furnished to one input terminal thereof and the amplitude threshold Vth is furnished to another input terminal thereof, and, when the output of the synchronization addition processing part 137 exceeds the amplitude threshold Vth, the amplitude comparator outputs an addition stop command to the AND circuit 139. The other structural components of this variant are the same as those of Embodiment 3.

According to the variant of this Embodiment 3, because a discriminating processing unit adds up the reflection signals S into each of which a noise n is mixed in synchronization with the ultrasonic pulses p, and performs the discriminating process on the reflection signal St only when this reflection signal has an amplitude exceeding the threshold, the reflection signals S1 to S3 having a small amplitude which are the target for the discriminating process are amplified, and the reflection signal St whose amplitude is increased is acquired. Therefore, the ultrasonic detection device can detect an obstacle (object) having a small reflecting surface or an object positioned at a long distance, and therefore can improve its sensitivity of obstacle detection.

Figure 9:
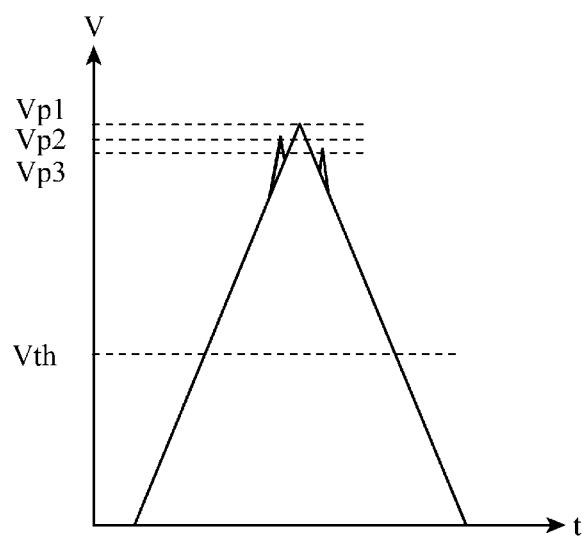
FIG. 9 is a view schematically showing a method of computing a maximum amplitude required to compute a pulse time width on the waveform of a pulse in the ultrasonic detection device in accordance with any one of Embodiments 1 to 3 of the present invention.

In the ultrasonic detection device in accordance with either of above-mentioned Embodiments 1 to 3, when the maximum amplitude $Vp$ has a large variation, errors are accumulated at the time of computing the pulse time width tw1 or tw2 which is the length of the base from either the area of the isosceles triangle or the area of the similar isosceles triangle, it is preferable to carry out a process of averaging the maximum amplitude. FIG. 9 is a view schematically showing a method of computing the maximum amplitude Vp required to compute the pulse time width on the waveform of a pulse.

As shown in FIG. 9, it is preferable that the largest one of the amplitudes exceeding the predetermined amplitude threshold Vth, the average of the n largest amplitudes (where n is a positive integer), or the average of the n largest amplitudes except the largest amplitude is defined as the maximum amplitude Vp of each of a reflection signal S and a noise n. The variation in the maximum amplitude $Vp$ can be suppressed by this measure, and the influence of the variation in the maximum amplitude $Vp$ on the computation of the pulse time width can be reduced.

Industrial Applicability

The ultrasonic detection device in accordance with the present invention is applied to, for example, a corner sensor of a vehicle, and discriminates a noise which is piggybacked onto a reflection signal from the reflection signal by using the time width of each pulse signal. More specifically, the ultrasonic detection device approximates the shape of each pulse signal which is a reflection signal s or a noise n received thereby as an isosceles triangle, computes a maximum amplitude Vp and an accumulated value (area S) of each of these signals during a time interval during which the signal has an amplitude equal to or larger than a predetermined amplitude threshold Vth, and computes the pulse time width which is the length of the base of the triangle from the values of $Vp$ and S to discriminate the noise from the reflection signal by using this pulse time width. In the case of quantization data, the ultrasonic detection device reduces the weight of data having an amplitude close to the amplitude threshold Vth by determining the area S of a portion of the isosceles triangle having an amplitude equal to or larger than the fixed amplitude threshold Vth, thereby reducing errors occurring in the sampling period. Furthermore, the ultrasonic detection device can determine the pulse time width with stability by determining the pulse time width which is the length of the base of a similar isosceles triangle having the longest base. Therefore, the ultrasonic detection device can be used for all applications for measuring the presence or absence of an obstacle (object), or measuring the distance to an object, to say nothing of a corner sensor.

The invention claimed is:

1. An ultrasonic detection device which transmits an ultrasonic pulse toward an object from a pulser thereof, and discriminates a noise mixed into a reflection signal received by a receiver thereof from the reflection signal by using a pulse time width, wherein said ultrasonic detection device includes a processing circuitry configured to perform a discriminating process of approximating a shape of each signal which is said reflection signal or a noise as an isosceles triangle and computing a pulse time width equal to a length of a base of said approximating isosceles triangle, and to discriminate between said reflection signal and the noise signal by determining whether said computed pulse time width exceeds a predetermined pulse width discrimination threshold, and wherein said processing circuitry computes the pulse time width which is the length of the base of said approximating isosceles triangle from an integral and a maximum of an amplitude which are acquired during a time interval during which the signal, which is the reflection signal or the noise signal, has an amplitude exceeding a first amplitude threshold continuously, and defines, as said maximum amplitude, a maximum of amplitudes exceeding a second predetermined amplitude, an average of n largest ones among the amplitudes (where n is an arbitrary positive integer), or an average of n largest ones among the amplitudes except said maximum to perform said discriminating process.

2. The ultrasonic detection device according to claim 1, wherein said processing circuitry computes the pulse time width which is the length of the base of said approximating isosceles triangle from an integral and a maximum of amplitudes which are acquired during a time interval during which the signal which is the reflection signal or the noise signal has an amplitude exceeding the first amplitude threshold continuously.

3. The ultrasonic detection device according to claim 1, wherein after computing the pulse time width which is the length of the base of said approximating isosceles triangle from said approximating isosceles triangle, said processing circuitry determines a similar isosceles triangle from a similarity expression of said approximating isosceles triangle and computes a pulse time width which is a length of a base of said similar isosceles triangle.

4. The ultrasonic detection device according to claim 1, wherein said processing circuitry performs said discriminating process on either a reflection signal which is acquired by adding a reflection signal onto which said noise is piggybacked a predetermined number of times in synchronization with said ultrasonic pulse or a reflection signal which is acquired by adding a reflection signal a number of times in synchronization with said ultrasonic pulse and whose amplitude exceeds a first predetermined amplitude.

* * * * *